Patented June 3, 1924.

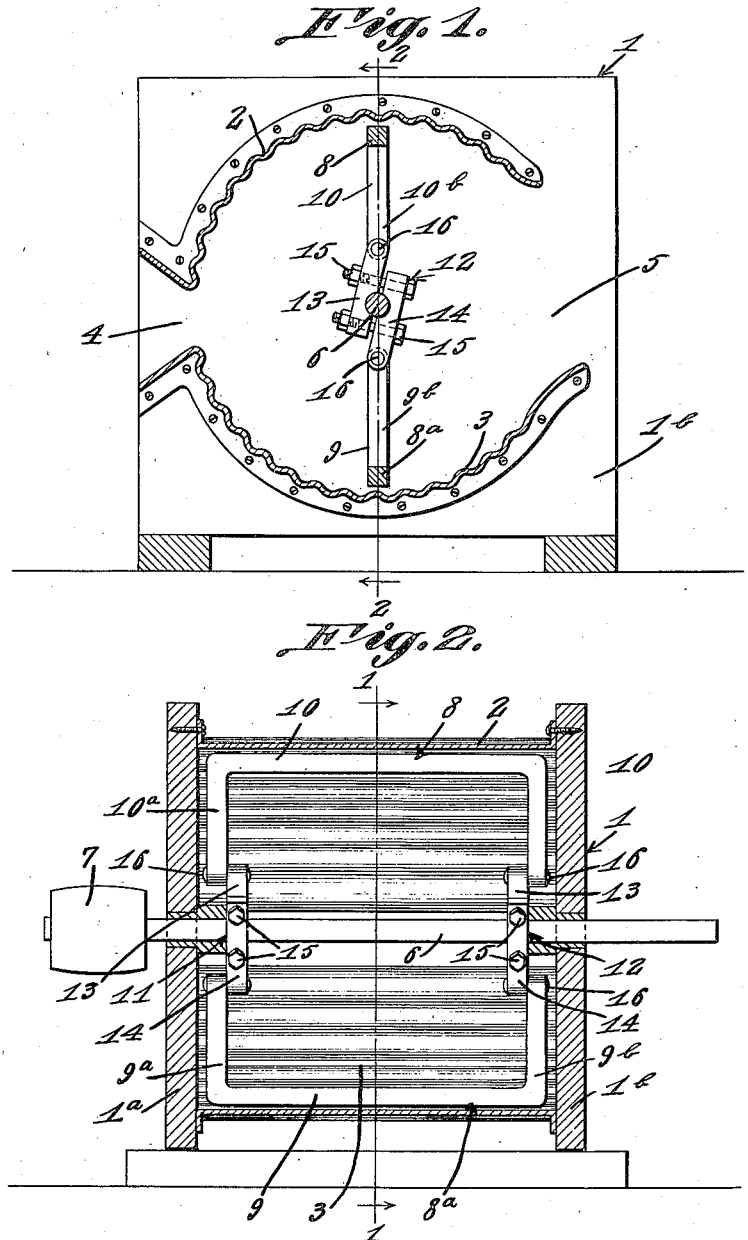

1,496,701

UNITED STATES PATENT OFFICE.

CHARLES E. WYMAN, OF PEKIN, INDIANA.

GRAIN SEPARATOR.

Application filed September 14, 1922. Serial No. 588,205.

*To all whom it may concern:*

Be it known that I, CHARLES E. WYMAN, a citizen of the United States, residing at Pekin, in the county of Washington and State of Indiana, have invented a new and useful Grain Separator, of which the following is a specification.

This invention relates to grain separators and more particularly to beaters therefor.

The object of the invention is to provide a separator having means to permit the passage of straw or other hard substances between the beaters and the concaves without danger of breaking the beater.

Another object is to provide a beater having wings which when the beater is at rest are limber and out of shape, but when the centrifugal motion begins, open out to their full circumference until the grain and straw is fed to the separator and which relax sufficiently to allow the straw to pass while at the same time striking the straw innumerable blows per minute to knock out the grain.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a transverse vertical section taken on the line 1—1 of Fig. 2, and Fig. 2 is a longitudinal section taken on the line 2—2 of Fig. 1.

This separator 1 comprises upper and lower concaves 2 and 3 spaced at their meeting or opposed edges to form an inlet mouth 4 and a discharge 5.

These concaves are corrugated longitudinally, being here shown constructed of sheet metal, although not necessarily so, and attached at their ends to upright supports $1^a$ and $1^b$ here shown mounted on a suitable base B.

A shaft 6 is journaled in the upright members $1^a$ and $1^b$ and extends centrally between the concaves 2 and 3, being provided at one end with a pulley 7 for connection with suitable driving means for rotating the shaft.

Beaters 8 and $8^a$ are carried by the shaft 6 within the concaves, two being here shown although obviously more may be employed if found desirable.

These beaters comprise U-shaped members 9 and 10 which extend substantially the full length of the grain receiving compartment formed by the concaves 2 and 3. The arm $10^b$ of the beater 10 and the arm $9^b$ of the beater 9 are pivotally connected at their free ends to a fixed member or a clamp 12 carried by the shaft 6 adjacent one end of the grain chamber.

These clamps, one of which is mounted at each end of the container and numbered 11 and 12 respectively are each composed of two bars 13 and 14 recessed in their opposed faces and engaged with the shaft 6 being fixedly secured thereto by bolts 15 extending through the bars on opposite sides of the shaft. These bars 13 and 14 are of substantially the same length and one end of one projects beyond the adjacent end of the other so that the arms $9^b$ and $10^b$ are pivoted to the projecting ends of these bars as shown at 16.

The arms $9^a$ and $10^a$ of the members 9 and 10 are similarly connected with the bars constituting the fixed clamping member 11.

It will thus be seen that these members 9 and 10 are pivotally connected at their free ends with the bars disposed on opposite sides of the shaft 6.

When the shaft 6 is rapidly rotated, the pivoted portions 9 and 10 of the beaters 8 and $8^a$ will open out so that the cross bars thereof will come into close proximity to the inner faces of the concaves.

It will thus be seen that the beater may be rotated in either direction against either concave, being constructed of two or more flexible arms or wings attached to the rotating shaft 6 by the fixed clamping members 11 and 12. This pivotal mounting of the wing members 9 and 10 will permit solid substances to pass between them and the concaves without danger of breaking the wings while at the same time they will operate to strike the straw fed between them and the concaves a great number of blows per minute so as to effectively knock out the grain.

I claim:—

In a grain separator, a supporting structure, a shaft mounted for rotation therein, imperforate concaves encompassing said shaft and spaced therefrom with an inlet and an outlet at diametrically opposite sides, longitudinally spaced clamps carried by said shafts and each composed of bars clamped to the shaft on opposite faces thereof with one end of one bar projecting beyond the adjacent end of the other on opposite sides of the shaft, and comparatively light U-shaped beaters pivotally connected at the free ends of their arms to the projecting ends of said bars, whereby said beaters are disposed in parallel planes and extended in opposite directions being adapted to pivot to permit hard substances to pass between them and the concaves and to swing freely to exert a beating connection on the grain.

In testimony that I claim the foregoing as my own, I have hereto affixed my signature in the presence of two witnesses.

CHARLES E. WYMAN.

Witnesses:
EDWARD B. JOHNSON,
PHYLLIS M. JOHNSON.